United States Patent
An et al.

(10) Patent No.: US 10,965,934 B2
(45) Date of Patent: Mar. 30, 2021

(54) SYSTEM ON CHIP AND INTEGRATED CIRCUIT FOR PERFORMING DATA LOOPBACK AND MOBILE DEVICE INCLUDING THE SAME

(71) Applicant: SAMSUNG ELECTRONICS CO., LTD., Suwon-si (KR)

(72) Inventors: Hyo Chan An, Suwon-si (KR); Min Chul Kim, Hwaseong-si (KR); Yon Jun Shin, Hwaseong-si (KR); Sang Heon Lee, Seongnam-si (KR); Dae Keon Park, Hwaseong-si (KR); Woon Yong Jo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 15/400,098

(22) Filed: Jan. 6, 2017

(65) Prior Publication Data
US 2017/0201746 A1 Jul. 13, 2017

(30) Foreign Application Priority Data
Jan. 8, 2016 (KR) .................. 10-2016-0002732

(51) Int. Cl.
*H04N 17/00* (2006.01)
(52) U.S. Cl.
CPC .................. *H04N 17/002* (2013.01)
(58) Field of Classification Search
CPC combination set(s) only.
See application file for complete search history.

(56) References Cited

U.S. PATENT DOCUMENTS

| | | | |
|---|---|---|---|
| 7,447,953 B2 | 11/2008 | Vogt | |
| 7,681,093 B2 | 3/2010 | Frodsham et al. | |
| 7,746,795 B2 | 6/2010 | Frodsham et al. | |
| 9,009,379 B1* | 4/2015 | Marena | G06F 13/4221 710/308 |
| 9,606,954 B2* | 3/2017 | Marena | G06F 13/4286 |
| 2007/0264730 A1* | 11/2007 | Frodsham | G01R 31/31716 438/14 |
| 2009/0315899 A1* | 12/2009 | Pourbigharaz | G06F 3/14 345/501 |
| 2010/0262671 A1 | 10/2010 | Chen et al. | |
| 2012/0069059 A1* | 3/2012 | Lee | G09G 3/3225 345/690 |
| 2012/0324302 A1* | 12/2012 | Arslan | G01R 31/318572 714/727 |

(Continued)

FOREIGN PATENT DOCUMENTS

| | | |
|---|---|---|
| JP | 2007-514216 | 5/2007 |
| KR | 10-0335372 | 5/2002 |
| KR | 10-2006-0062762 | 6/2006 |

*Primary Examiner* — Yee F Lam
(74) *Attorney, Agent, or Firm* — F. Chau & Associates, LLC

(57) ABSTRACT

A system on chip includes a display serial interface (DSI) host device, a camera serial interface (CSI) host device, a first register, and a loopback control circuit. The first register is configured to store a first flag indicating whether the system on chip is operating in a loopback mode or a non-loopback mode. The loopback control circuit is configured to loop back data generated by the DSI host device to the CSI host device in response to the first flag indicating that the system on chip is operating in the loopback mode.

18 Claims, 11 Drawing Sheets

(56) References Cited

U.S. PATENT DOCUMENTS

| | | |
|---|---|---|
| 2013/0195210 A1 | 8/2013 | Swarbrick et al. |
| 2013/0233935 A1 | 9/2013 | Radulescu |
| 2014/0281753 A1* | 9/2014 | Wagh ................. G06F 13/4295 714/56 |
| 2014/0289434 A1* | 9/2014 | Ranganathan .......... G06F 13/42 710/105 |
| 2014/0368667 A1* | 12/2014 | Peterson ................... H04L 7/10 348/187 |
| 2015/0199291 A1* | 7/2015 | Marena ............... G06F 13/4221 710/106 |
| 2015/0205741 A1 | 7/2015 | Iyer et al. |
| 2016/0203099 A1* | 7/2016 | Kim .................... G06F 13/4068 710/105 |
| 2016/0274821 A1* | 9/2016 | Park ...................... G06F 13/102 |
| 2017/0116150 A1* | 4/2017 | Wiley ................. G06F 13/4282 |
| 2017/0117979 A1* | 4/2017 | Sengoku ................. G06F 21/85 |
| 2017/0118039 A1* | 4/2017 | Wiley .................... G06F 13/42 |
| 2017/0176534 A1* | 6/2017 | Chellappan ...... G01R 31/31723 |
| 2018/0027174 A1* | 1/2018 | Sengoku ............ H04N 5/23225 348/207.11 |
| 2018/0113779 A1* | 4/2018 | Carosa ................ G06F 11/3656 |

* cited by examiner

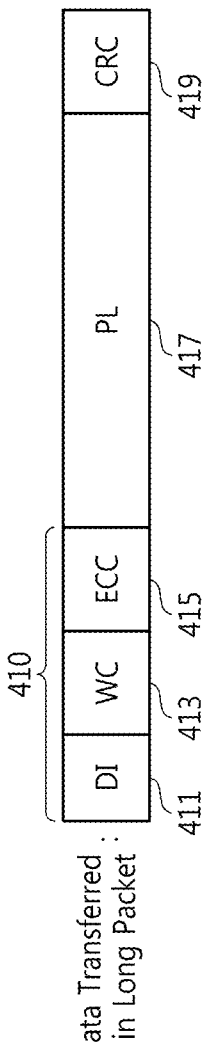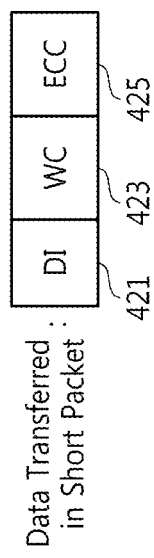
FIG. 3A
FIG. 3B

FIG. 4

Table 1

| CODE | Description |
|------|-------------|
| CODE1-1 | VSA |
| CODE1-2 | HSA |
| CODE1-3 | DATA1 |
| CODE1-4 | DATA2 |
| CODE1-5 | ETC1 |
| CODE1-6 | ETC2 |

Table 2

| CODE | Description |
|------|-------------|
| CODE2-1 | FS |
| CODE2-2 | FE |
| CODE2-3 | DATA3 |

Conversion
Delete
Conversion
Conversion

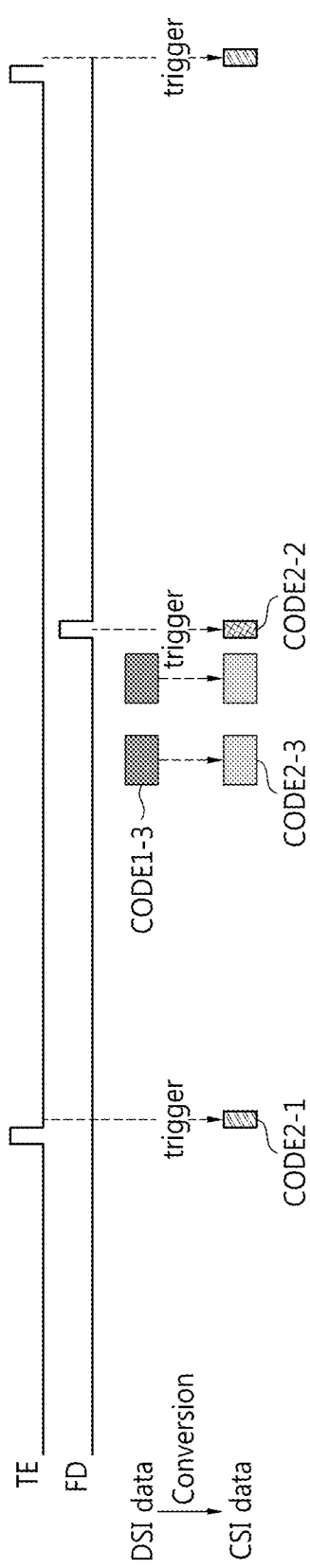

SYSTEM ON CHIP AND INTEGRATED CIRCUIT FOR PERFORMING DATA LOOPBACK AND MOBILE DEVICE INCLUDING THE SAME

CROSS-REFERENCE TO RELATED APPLICATIONS

This application claims priority under 35 U.S.C. § 119 to Korean Patent Application No. 10-2016-0002732 filed on Jan. 8, 2016, the disclosure of which is incorporated by reference herein in its entirety.

TECHNICAL FIELD

Exemplary embodiments of the inventive concept relate to a system on chip (SOC), and more particularly, to a SOC allowing loopback of data from a display serial interface (DSI) of the SOC to a camera serial interface (CSI) of the SOC during testing of the SOC.

DISCUSSION OF THE RELATED ART

As manufacturing and design processes of a system on chip (SOC) become more complex, a fault rate may increase during manufacturing. Thus, the SOC is typically tested after manufacturing to determine whether the SoC is faulty.

To test a display serial interface (DSI) and a camera serial interface (CSI) included in the SOC, a device (e.g., a chip external to the SOC) symmetrically corresponding to the DSI is connected to the DSI, and a device (e.g., a chip external to the SOC) symmetrically corresponding to the CSI is connected to the CSI. The SOC may then be tested by checking the similarity of data transmitted and received by the DSI and the CSI.

SUMMARY

According to an exemplary embodiment of the inventive concept, a system on chip includes a display serial interface (DSI) host device, a camera serial interface (CSI) host device, a first register, and a loopback control circuit. The first register is configured to store a first flag indicating whether the system on chip is operating in a loopback mode or a non-loopback mode. The loopback control circuit is configured to loop back data generated by the DSI host device to the CSI host device in response to the first flag indicating that the system on chip is operating in the loopback mode.

According to an exemplary embodiment of the inventive concept, a mobile device includes a system on chip, an image sensor connected to the system on chip through a camera serial interface (CSI), and a display connected to the system on chip through a display serial interface (DSI). The system on chip includes a DSI host device, a CSI host device, a first register, and a loopback control circuit. The first register is configured to store a first flag indicating whether the system on chip is operating in a loopback mode or a non-loopback mode. The loopback control circuit is configured to loop back data generated by the DSI host device to the CSI host device in response to the first flag indicating that the system on chip is operating in the loopback mode.

According to an exemplary embodiment of the inventive concept, an integrated circuit includes a display serial interface (DSI) host device, a camera serial interface (CSI) host device, and a first register. The first register is configured to store a first flag indicating a protocol of a packet header. The DSI host device generates the packet header in response to the first flag, and generates data by merging the packet header and a payload.

According to an exemplary embodiment of the inventive concept a system on chip includes a display serial interface (DSI) host device, a camera serial interface (CSI) host device, a display controller, a loopback control circuit, a camera controller, and a processor. The display controller is connected to the DSI host device, and the display controller generates a first payload and transmits the first payload to the DSI host device. The loopback control circuit is configured to loop back the first payload from the DSI host device to the CSI host device. The camera controller is connected to the CSI host device. The camera controller generates a second payload that is identical to the first payload as initially generated by the display controller, and compares the second payload with the looped back first payload. The processor determines whether the system on chip is faulty based on a comparison result obtained by the camera controller comparing the second payload with the looped back first payload.

BRIEF DESCRIPTION OF THE DRAWINGS

The above and other features of the inventive concept will become more apparent by describing in detail exemplary embodiments thereof with reference to the accompanying drawings, in which:

FIG. 3A is a diagram illustrating the structure of data when the SOC transfers data in a long packet format, according to exemplary embodiments of the inventive concept.

FIG. 3B is a diagram illustrating the structure of data when the SOC transmits data in a short packet format, according to exemplary embodiments of the inventive concept.

FIG. 4 is a diagram showing a code table of a data identifier included in display serial interface (DSI) data, and a code table of a data identifier included in camera serial interface (CSI) data, according to exemplary embodiments of the inventive concept.

FIG. 5B illustrates an example in which DSI data is converted to CSI data when the SOC operates in a command mode, according to exemplary embodiments of the inventive concept.

DETAILED DESCRIPTION OF THE EXEMPLARY EMBODIMENTS

Figure 1:
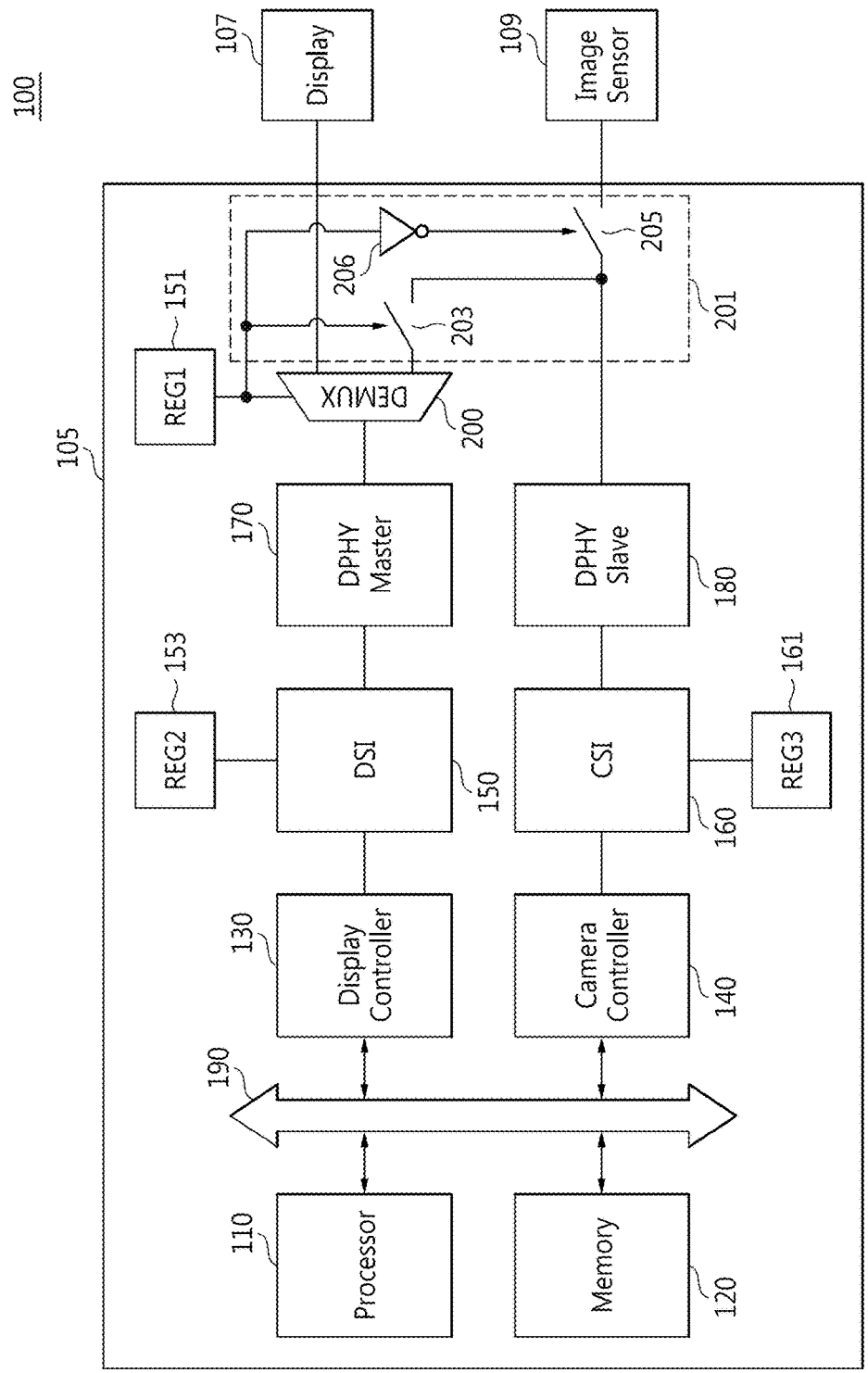
FIG. 1 is a block diagram of a mobile device according to exemplary embodiments of the inventive concept.

Exemplary embodiments of the inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

As used herein, the singular forms "a", "an" and "the" are intended to include the plural forms as well, unless the context clearly indicates otherwise.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the inventive concept.

As used herein, the term "display serial interface (DSI) protocol" may refer to the data format of data which allows a system on chip (SOC) to normally transfer the data to a display through a DSI, the term "DSI packet header" may refer to a data set which is generated using the DSI protocol and represents the content and feature of data, and the term "DSI data" may refer to a data set including the DSI packet header and a payload. Similarly, the term "camera serial interface (CSI) protocol" may refer to the data format of data which allows the SOC to normally receive the data collected or generated by an image sensor (e.g., a camera), the term "CSI packet header" may refer to a data set which is generated using the CSI protocol and represents the content and feature of data, and the term "CSI data" may refer to a data set including the CSI packet header and a payload.

FIG. 1 is a block diagram of a mobile device 100 according to exemplary embodiments of the inventive concept. The mobile device 100 may include a SOC 105, a display 107 (also referred to as a display device 107), and an image sensor 109. The mobile device 100 may process image data. The mobile device 100 may be implemented as, for example, a laptop computer, a cellular phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The SOC 105 may control the display 107 and the image sensor 109. The SOC 105 may be, for example, an integrated circuit (IC), a processor, an application processor (AP), a multimedia processor, or an integrated multimedia processor. The SOC 105 may include, for example, a processor 110, a memory 120, a display controller 130, a camera controller 140, a DSI host device 150, a first register 151, a second register 153, a third register 161, a CSI host device 160, a DPHY master 170, a DPHY slave 180, a bus 190, a loopback control circuit 200, and a selection circuit 201. The loopback control circuit 200 may include, for example, a demultiplexer (DEMUX). The SOC 105 may also include other elements that are not illustrated in FIG. 1.

The processor 110 may control the overall operation of the SOC 105. For example, the processor 110 may control the memory 120, the display controller 130, the camera controller 140, the DSI host device 150, the first register 151, the second register 153, the third register 161, the CSI host device 160, the DPHY master 170, the DPHY slave 180, the loopback control circuit 200, and the selection circuit 201 through the bus 190. For example, the processor 110 may control the operation of the loopback control circuit 200 and/or the selection circuit 201 using a flag stored in the first register 151, may control the operation of the DSI host device 150 using a flag stored in the second register 153, and may control the operation of the CSI host device 160 using a flag stored in the third register 161.

Here, the registers 151, 153, and 161 may be a data storage device which stores data/information. A flag stored in the registers 151, 153, and 161 may include, for example, at least one bit.

In exemplary embodiments, the processor 110 may be implemented as a multi-core processor. The multi-core processor is a single computing component with two or more independent actual processors (referred to as cores). Each of the processors reads and executes program instructions. In exemplary embodiments, the processor 110 may be implemented as a single-core processor.

The memory 120 may store data used for the operation of the SOC 105. The data may be, for example, image data. The memory 120 may be formed of volatile memory and/or non-volatile memory. The volatile memory may be, for example, random access memory (RAM), dynamic RAM (DRAM), static RAM (SRAM), thyristor RAM (T-RAM), zero capacitor RAM (Z-RAM), or twin transistor RAM (TTRAM). The non-volatile memory may be, for example, electrically erasable programmable read-only memory (EEPROM), flash memory, magnetic RAM (MRAM), spin-transfer torque MRAM, ferroelectric RAM (FeRAM), phase-change RAM (PRAM), resistive RAM (RRAM), nanotube RRAM, polymer RAM (PoRAM), nano floating gate memory (NFGM), holographic memory, molecular electronics memory device, or insulator resistance change memory.

The display controller 130 may control the operation of the display 107. The display controller 130 may receive image data to be displayed on the display 107 through the bus 190, convert the image data into a signal for transmission to the display 107 (e.g., a signal according to an interface protocol), and send the signal to the display 107. The display controller 130 may transmit the data to the display 107 according to, for example, the mobile industry processor interface (MIPI) D-PHY standard.

The camera controller 140 may control the operation of the image sensor 109. The camera controller 140 may receive data generated by the image sensor 109 and may transmit the data to the processor 110 through the bus 190.

The DSI host device 150 may be a DSI defined in the MIPI standard. However, the inventive concept is not limited to the MIPI DSI.

The second register 153 may store a second flag indicating packet header protocol conversion. For example, the second flag may indicate whether a packet header to be generated by the DSI host device 150 (e.g., a packet header corresponding to data stored in the memory 120) is to be generated as a CSI packet header or a DSI packet header. The DSI host device 150 may generate a CSI packet header using the second flag. The second flag may include information about the protocol of a packet header. The second flag may also include information about whether the SOC 105 transmits data in a video mode or a command mode and/or whether the data is transmitted in a long packet format or a short packet format.

As used herein, the video mode refers to a mode in which a sync signal used for data transmission in the DSI host device 150 is generated, and the command mode refers to a mode in which a sync signal used for data transmission in the display 107 is generated. In addition, a video mode test refers to testing the SOC 105 in the video mode, a video mode protocol refers to a protocol conversion process used to convert the DSI protocol to the CSI protocol when the SOC 105 transmits and receives data in the video mode, and video mode data refers to CSI or DSI data generated in the video mode. In addition, a command mode test refers to testing the SOC 105 in the command mode, a command mode protocol refers to a protocol conversion process used to convert the DSI protocol to the CSI protocol when the SOC 105 transmits and receives data in the command mode, and command mode data refers to CSI or DSI data generated in the command mode. The protocol conversion process according to the command mode protocol may be different than the protocol conversion process according to the video mode protocol. For example, a packet header conversion protocol corresponding to video mode data may be different from a packet header conversion protocol corresponding to command mode data. In addition, a long packet refers to data including a packet header and a payload, and a short packet refers to data including only a packet header.

The DSI host device 150 may transmit data to the display 107 according to the control of the processor 110. The DSI host device 150 may generate a packet header in response to the second flag. The DSI host device 150 may generate data by merging a payload with the packet header, and may transmit the data to the CSI host device 160. The data may be DSI or CSI data. The payload may be data stored in the memory 120 or data generated by the display controller 130. However, the inventive concept is not limited thereto. For example, in exemplary embodiments, the payload may be data received from the memory 120, the display controller 130, or another element.

The CSI host device 160 may process data received from the image sensor 109 and send the processed data to the processor 110. The CSI host device 160 may also receive data from the DSI host device 150, divide the data into a packet header and a payload, and control unpacking of the payload using the packet header. The CSI host device 160 may convert a packet header received from the DSI host device 150 into a CSI packet header that is usable in the CSI host device 160 in response to a third flag stored in the third register 161.

The CSI host device 160 may be a CSI defined in the MIPI standard. However, the inventive concept is not limited to the MIPI CSI.

The unpacked payload may be the same as or different from the payload that the DSI host device 150 receives from the display controller 130. The CSI host device 160 may send the unpacked payload to the camera controller 140.

A payload may be, for example, image data in a Bayer pattern, or image data in a RGB format, YUV format, or YCbCr format. However, the format of the payload is not limited to these examples. The payload may be any one from among a payload generated by the camera controller 140, a payload stored in the memory 120, and an unpacked payload.

The third register 161 may store the third flag indicating packet header protocol conversion. For example, the third flag may indicate whether a packet header (e.g., a looped-back packet header corresponding to looped-back data) is to be converted to another protocol. For example, the third flag may indicate that a DSI packet header (e.g., a looped-back DSI packet header) is to be converted to a CSI packet header that is usable in the CSI host device 160. For example, the CSI host device 160 may convert a packet header received from the DSI host device 150 to a CSI packet header that is usable in the CSI in response to the third flag. The third flag may include information about the protocol of the packet header. The third flag may also include information about whether the SOC 105 transfers data in the video mode or the command mode and/or whether the data is transmitted in the long packet format or the short packet format.

A DPHY may include the DPHY master 170 and the DPHY slave 180. According to exemplary embodiments, the DPHY may include a plurality of DPHY masters 170 and/or a plurality of DPHY slaves 180. For example, in exemplary embodiments, the DPHY may include four DPHY masters 170 and/or four DPHY slaves 180. However, the number of DPHY masters 170 and DPHY slaves 180 is not limited thereto. In exemplary embodiments, the DPHY may not include the DPHY slave 180.

The DPHY master 170 may transmit data from the DSI host device 150 to the display 107. The DPHY master 170 may include lanes. The number of lanes may be, for example, four. However, the number of lanes of the DPHY master 170 is not limited thereto. The DPHY slave 180 may transmit data from the image sensor 109 to the CSI host device 160. The DPHY slave 180 may include lanes. The number of lanes may be, for example, four. However, the number of lanes of the DPHY slave 180 is not limited thereto.

The elements 110, 120, 130, 140, 150, 160, 170, 180, and 200 may communicate with one another through the bus 190. That is, the bus 190 connects to each of the elements 110, 120, 130, 140, 150, 160, 170, 180, and 200 of the SOC 105, thus providing a path for data transmission between the elements 110, 120, 130, 140, 150, 160, 170, 180, and 200. The bus 190 also provides a path for transmission of a control signal between the elements 110, 120, 130, 150, 160, 170, 180, and 200.

Thus, the bus 190 may include, for example, a data bus for transmitting data, an address bus for transmitting an address signal, and a control bus for transmitting a control signal. In exemplary embodiments, the bus 190 may include a small-scale bus (e.g., an interconnector for data communication between predetermined elements).

The first register 151 may store a first flag indicating whether the SOC 105 is currently operating in a loopback mode or a non-loopback mode. When operating in the loopback mode, the DSI host device 150 loops back data (e.g., transmits data) to the CSI host device 160. The loopback control circuit 200 may receive data from the DPHY master 170. The loopback control circuit 200 may transmit the data to the CSI host device 160 or the display 107 in response to the first flag. For example, when the first flag stored in the first register 151 indicates that the SOC 105 is in the loopback mode, the loopback control circuit 200 may transmit the data to the CSI host device 160. When the first flag stored in the first register 151 indicates that the SOC is in the non-loopback mode, the loopback control circuit 200 may transmit the data to the display 107.

The selection circuit 201 may control the connection between the loopback control circuit 200 and the DPHY slave 180, and the connection between the loopback control circuit 200 and the image sensor 109, in response to the first flag. The selection circuit 201 may include a plurality of switches. As shown in FIG. 1, in an exemplary embodiment, the selection circuit 201 may include a first switch 203 and a second switch 205. However, the number of switches included in the selection circuit 201 is not limited thereto.

The first switch 203 and the second switch 205 may be turned on or off in response to the first flag. According to exemplary embodiments, the first and second switches 203 and 205 are not turned on at the same time or off at the same time. For example, according to exemplary embodiments, the second switch 205 is turned off when the first switch 203 is turned on, and the second switch 205 is turned on when the first switch 203 is turned off.

When the loopback control circuit 200 transmits data from the DPHY master 170 to the CSI host device 160 in response to the first flag, the first switch 203 is turned off and the second switch 205 is turned on. When the loopback control circuit 200 transmits the data to the display 107 in response to the first flag, the first switch 203 is turned on and the second switch 205 is turned off.

The selection circuit 201 may include an inverter 206 to turn on only one of the first and second switches 203 and 205 at a time. The inverter may invert a signal transmitted to either the first switch 203 or the second switch 205. The display 107 may display data received through the DSI host device 150. The image sensor 109 may capture an image of an object and send data generated as the capturing result to the SOC 105.

Figure 2A:
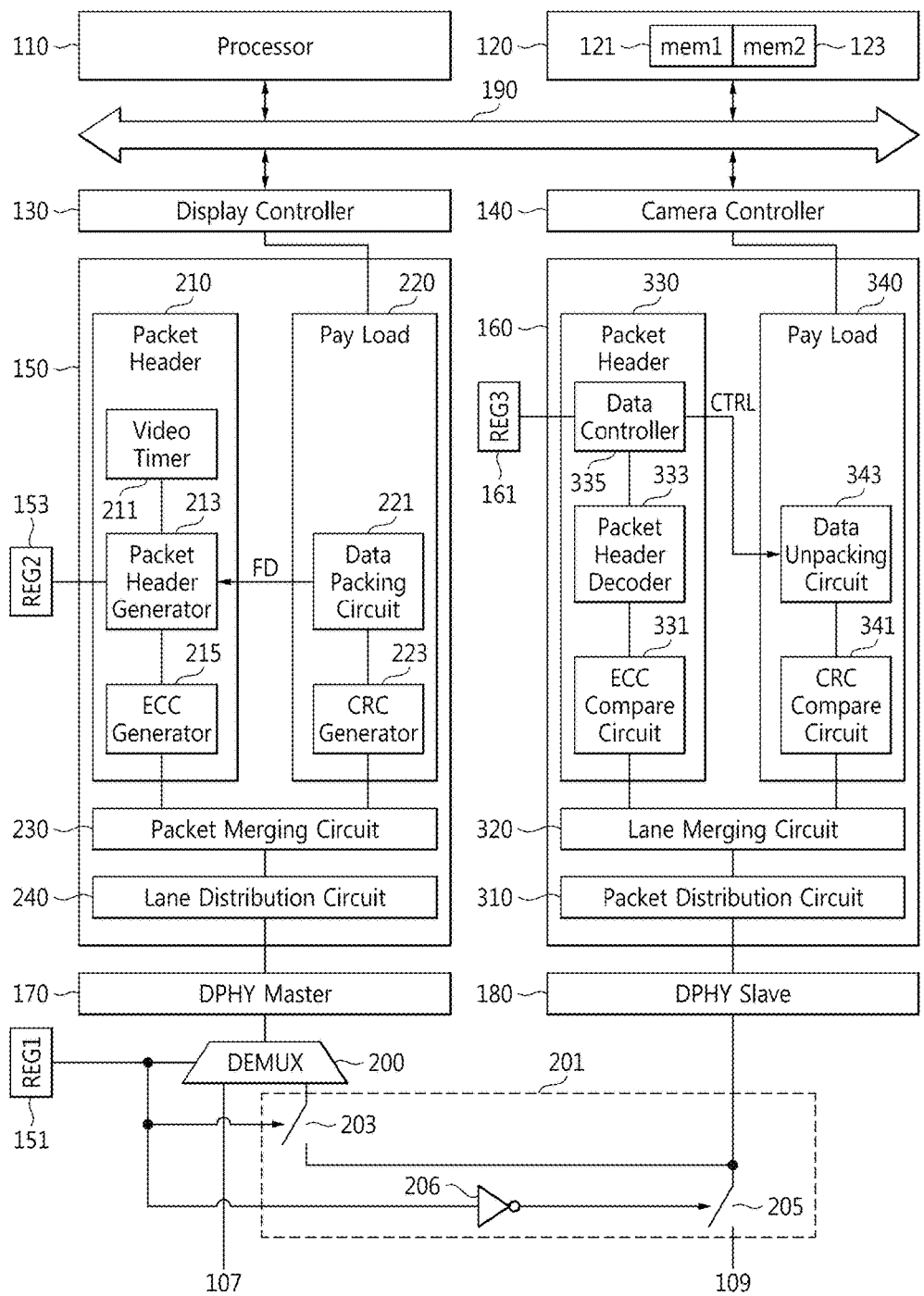
FIG. 2A is a detailed block diagram of a system on chip (SOC) illustrated in FIG. 1 according to exemplary embodiments of the inventive concept.

FIG. 2A is a detailed block diagram of the SOC 105 illustrated in FIG. 1 according to exemplary embodiments of the inventive concept. Referring to FIGS. 1 and 2A, the memory 120 may include a first memory 121 and a second memory 123.

The first memory 121 may store data to be transmitted to the DSI host device 150 through the display controller 130. The data stored in the first memory 121 may be a first DSI payload. The second memory 123 may store data to be transmitted to the CSI host device 160 through the camera controller 140. The data stored in the second memory 123 may be a second DSI payload.

The processor 110 may compare the first DSI payload with the second DSI payload, and may determine the similarity between the first DSI payload and the second DSI payload (e.g. may determine whether the first DSI payload matches the second DSI payload). The processor 110 may determine whether the SOC 105 is faulty based on this determination. For example, when the first DSI payload and the second DSI payload match, the processor 110 may determine that the SOC 105 is operating normally. In contrast, when the first DSI payload and the second DSI payload do not match, the processor 110 may determine that the SOC 105 is faulty.

The DSI host device 150 may include a DSI packet header circuit 210, a DSI payload circuit 220, a packet merging circuit 230, and a lane distribution circuit 240. The DSI packet header circuit 210 may include a video timer 211, a packet header generator 213, and an error correction code (ECC) generator 215.

The video timer 211 may generate a sync signal(s) for designating the operation timing of the SOC 105. An interval at which the video timer 211 generates the sync signals may be changed according to exemplary embodiments. The interval may be, for example, 1/60 seconds. However, the interval is not limited thereto. The video timer 211 may send the sync signal(s) to the packet header generator 213. The sync signal(s) generated by the video timer 211 may vary with the operation mode of the SOC 105. For example, when the SOC 105 operates in the video mode, the video timer 211 may generate a vertical sync signal, a horizontal sync signal, and a horizontal act signal. When the SOC 105 operates in the command mode, the video timer 211 may generate a tearing effect signal.

The packet header generator 213 may receive the sync signal(s) from the video timer 211, and may generate a packet header using the second flag stored in the second register 153 based on the sync signal(s). The packet header may include a data identifier indicating the feature/attribute of data, and a word count indicating the length or size of a payload. The packet header may be either a DSI packet header or a CSI packet header.

The ECC generator 215 may add an ECC to the packet header generated by the packet header generator 213. The ECC may be used for detection of a change in the packet header or correction of the changed packet header during the transmission or processing of the packet header.

The DSI payload circuit 220 may receive a payload from the display controller 130. The DSI payload circuit 220 may include a data packing circuit 221 and a cyclic redundancy check (CRC) generator 223.

The data packing circuit 221 may determine whether to compress the payload. For example, when the payload contains 3-byte RGB data per pixel, the data packing circuit 221 may compress each of red (R), green (G) and blue (B) data of one byte (e.g., eight bits) into 6-bit data by removing dummy bits. When data or CSI data is generated using the command mode protocol, the data packing circuit 221 may send a frame finish signal FD, which indicates that one frame ends, to the packet header generator 213.

The CRC generator 223 may receive the payload and add a CRC code to the payload. The CRC code may be used for detection of a change in the payload during the processing or transmission of the payload.

The packet merging circuit 230 may merge the packet header and the payload to generate data. The data may be either CSI data or DSI data according to the protocol of the packet header.

The lane distribution circuit 240 may distribute the data to the lanes of the DPHY master 170. As described above, in exemplary embodiments, the number of lanes may be four. When the number of lanes is four, the lane distribution circuit 240 may transmit (4n−3)-th bits (where n is a natural number) from among the bits in the data to the first lane, (4n−2)-th bits from among the bits in the data to the second lane, (4n−1)-th bits from among the bits in the data to the third lane, and 4n-th bits from among the bits in the data to the fourth lane. The lane distribution circuit 240 may transmit the bits to the lanes in parallel.

The CSI host device 160 may include a packet distribution circuit 310, a lane merging circuit 320, a CSI packet header circuit 330, and a CSI payload circuit 340. The packet distribution circuit 310 may distribute data (e.g., separate data) received from the DPHY slave 180 into a packet header and a payload. The lane merging circuit 320 may merge data separately transmitted through the lanes of the DPHY slave 180. The CSI packet header circuit 330 may include an ECC compare circuit 331, a packet header decoder 333, and a data controller 335.

The ECC compare circuit 331 may determine whether an error has occurred in the packet header generated as a result of the distribution of the data using an ECC code added by the DSI host device 150. According to exemplary embodiments, the CSI host device 160 may correct the error in the packet header, or may detect the error in the packet header without correcting the error.

The packet header decoder 333 may decode the packet header and determine the attribute/feature of the payload generated as a result of the distribution of the data.

The data controller 335 may convert a packet header having a first format to a packet header having a second format different from the first format. For example, when the DSI host device 150 transmits DSI data, the data controller 335 may convert a DSI packet header received from the DSI host device 150 to a CSI packet header, which is usable in the CSI host device 160, in response to the third flag stored in the third register 161. The data controller 335 may send a control signal CTRL for controlling decompression of the payload based on the attribute/feature of the payload, which has been determined by the packet header decoder 333, to a data unpacking circuit 343 of the CSI payload circuit 340.

The CSI payload circuit 340 may include a CRC compare circuit 341 and the data unpacking circuit 343. The CRC compare circuit 341 may compare and analyze the CRC code added to the payload by the DSI host device 150, and may detect whether an error has occurred in the payload based on the comparison and analysis result. The data unpacking circuit 343 may decompress the payload received from the CRC compare circuit 341 according to the control of the data controller 335. The second DSI payload may be the same as or different from the first DSI payload received by the DSI host device 150.

The functions and structure of the processor 110, the display controller 130, the camera controller 140, the bus 190, the loopback control circuit 200, the selection circuit 201, the first register 151, and the second register 153, which are not described with reference to FIG. 2A, may be the same as those of the processor 110, the display controller 130, the camera controller 140, the bus 190, the loopback control circuit 200, the selection circuit 201, the first register 151, and the second register 153 as described with reference to FIG. 1.

Figure 2B:
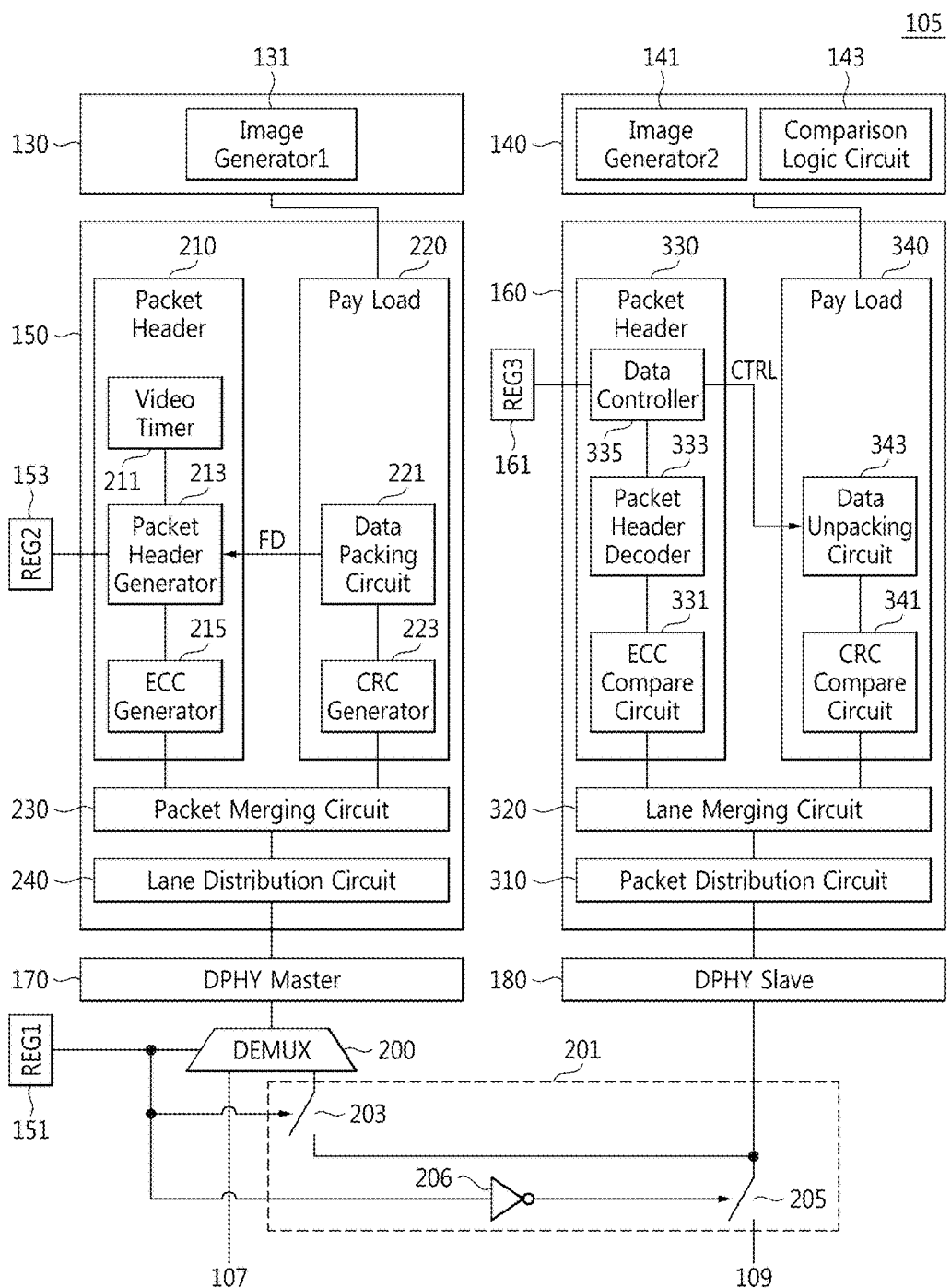
FIG. 2B is a detailed block diagram of the SOC illustrated in FIG. 1 according to exemplary embodiments of the inventive concept.

FIG. 2B is a detailed block diagram of the SOC 105 illustrated in FIG. 1 according to exemplary embodiments of the inventive concept. Referring to FIGS. 1 and 2B, the display controller 130 may include a first image generator 131. The first image generator 131 may generate a payload (referred to hereinafter with reference to FIG. 2B as a first payload) according to the control of the processor 110 and send the first payload to the DSI host device 150.

The camera controller 140 may include a second image generator 141 and a comparison logic circuit 143. The second image generator 141 may generate a payload (referred to hereinafter with reference to FIG. 2B as a second payload) that is identical to the first payload generated by the first image generator 131 according to the control of the processor 110. The second image generator 141 may send the second payload to the comparison logic circuit 143.

The comparison logic circuit 143 may receive a payload from the CSI host device 160 and the second payload from the second image generator 141, and may compare the payload received from the CSI host device 160 with the second payload to determine the similarity between the payload received from the CSI host device 160 and the second payload (e.g., to determine whether the payloads match). The comparison logic circuit 143 may send the determination result to the processor 110, and the processor 110 may determine whether the SOC 105 is faulty based on the determination result indicating the similarity between the payload received from the CSI host device 160 and the second payload (e.g., based on whether the payloads match).

The functions and structure of the processor 110, the memory 120, the bus 190, the loopback control circuit 200, the selection circuit 201, the first register 151, the second register 153, and the third register 161, which are not described with reference to FIG. 2B, may be the same as those of the processor 110, the memory 120, the bus 190, the loopback control circuit 200, the selection circuit 201, the first register 151, the second register 153, and the third register 161 as described with reference to FIG. 1.

FIG. 3A is a diagram illustrating the structure of data when the SOC 105 transmits data in a long packet format, according to exemplary embodiments of the inventive concept. Referring to FIGS. 1 through 3A, when the SOC 105 operates in the video mode, a data packet may include a packet header 410, a payload 417, and a CRC code 419. The data packet may be either DSI data or CSI data.

The packet header 410 may include a data identifier 411, a word count 413, and an ECC 415. The packet header 410 may be either a DSI packet header or a CSI packet header. The data identifier 411 may include information about the feature/attribute of the payload 417. The data identifier 411 may be, for example, 1-byte data. The word count 413 may include information indicating a data size (also referred to as a data length) of the payload 417. The word count 413 may be, for example, 2-byte data. The ECC 415 may include bit codes used to detect and/or correct an error in the data identifier 411 and the word count 413. The ECC 415 may be, for example, 1-byte data.

The payload 417 may be received from the memory 120 or the display controller 130. The payload 417 may be generated using either a DSI protocol or a CSI protocol.

The CRC code 419 may include bit codes used to detect an error in the payload 417. The CRC code 419 may be, for example, 2-byte data.

FIG. 3B is a diagram illustrating the structure of data when the SOC 105 transmits data in a short packet format, according to exemplary embodiments of the inventive concept. Referring to FIGS. 1, 2A, 2B, and 3B, when the SOC 105 operates in the video mode, a data packet may include a data identifier 421, a word count 423, and an ECC 425. The functions and structure of the data identifier 421, the word count 423, and the ECC 425 illustrated in FIG. 3B may be the same as those of the data identifier 411, the word count 413, and the ECC 415 illustrated in FIG. 3A.

Figure 5A:
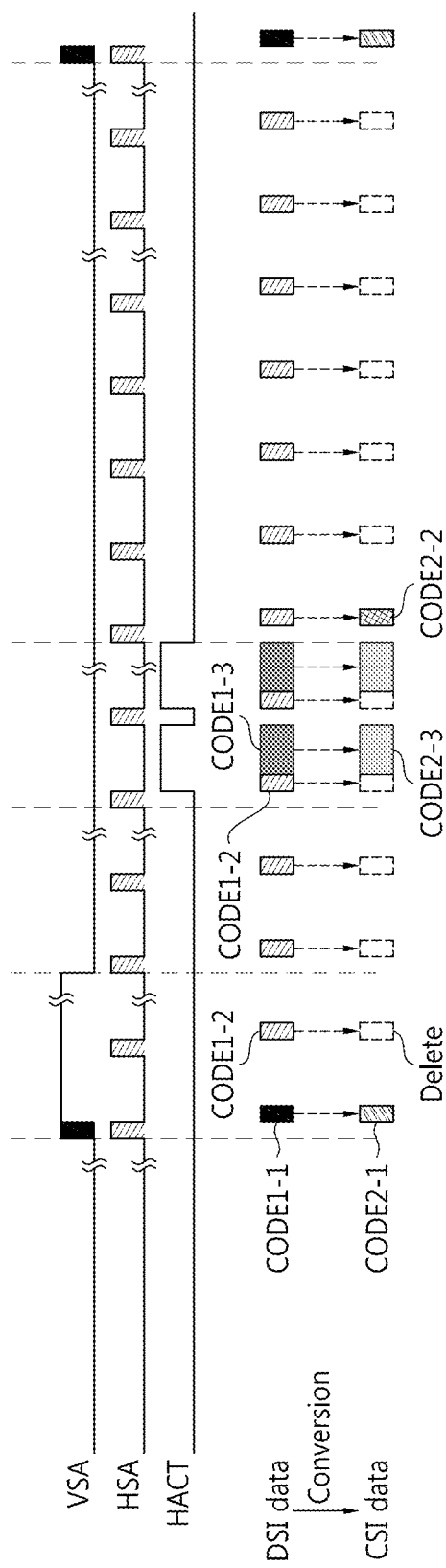
FIG. 5A illustrates an example in which DSI data is converted to CSI data when the SOC operates in a video mode, according to exemplary embodiments of the inventive concept.

FIG. 4 is a diagram showing a code table of a data identifier included in DSI data, and a code table of a data identifier included in CSI data, according to exemplary embodiments of the inventive concept. FIG. 5A illustrates an example in which DSI data is converted to CSI data when the SOC 105 operates in the video mode, according to exemplary embodiments of the inventive concept. FIG. 5B illustrates an example in which DSI data is converted to CSI data when the SOC 105 operates in the command mode, according to exemplary embodiments of the inventive concept.

Referring to FIGS. 1, 2A, 2B, 4, and 5A, when the SOC 105 operates in the video mode, the video timer 211 may generate a vertical sync signal VSA, a horizontal sync signal HSA, and a horizontal act signal HACT. The vertical sync signal VSA may be triggered once per frame. The horizontal sync signal HSA may be triggered at each of the lines included in a frame. The horizontal act signal HACT may be triggered when DSI data is transmitted to the DSI host device 150. When the horizontal act signal HACT is activated, DSI data may be converted to CSI data.

For example, when the video timer 211 generates the vertical sync signal VSA, the packet header generator 213 may convert a first code value CODE1-1 of the vertical sync signal VSA to a fifth code value CODE2-1 of a frame start code FS in a CSI protocol, which corresponds to the first code value CODE1-1, in response to the second flag stored in the second register 153. When the video timer 211 generates the horizontal sync signal HSA, the packet header generator 213 may delete a second code value CODE1-2 of the horizontal sync signal HSA in response to the second flag stored in the second register 153. The second code value CODE1-2 is deleted because there is no code corresponding to the second code value CODE1-2 in the CSI protocol. When data is transmitted in a long packet format, the packet header generator 213 may convert a third code value CODE1-3 or CODE1-4 of data DATA1 or DATA2, which corresponds to an instruction to receive a payload from the display controller 130, to a seventh code value CODE2-3, in response to the second flag stored in the second register 153.

Referring to FIGS. 1, 2A, 2B, 4, and 5B, when the SOC 105 operates in the command mode, the video timer 211 may generate a tearing effect signal TE. The tearing effect signal TE may be triggered, for example, once per frame.

For example, when the tearing effect signal TE is triggered by the video timer 211, the packet header generator 213 may convert the tearing effect signal TE to the fifth code value CODE2-1 of the frame start code FS in the CSI protocol in response to the second flag stored in the second register 153. When the data packing circuit 221 sends the frame finish signal FD indicating the end of one frame to the packet header generator 213, the frame finish signal FD is triggered, and the packet header generator 213 may convert the frame finish signal FD to a sixth code value CODE2-2 of a frame end code FE in the CSI protocol in response to the second flag stored in the second register 153.

Figure 6A:
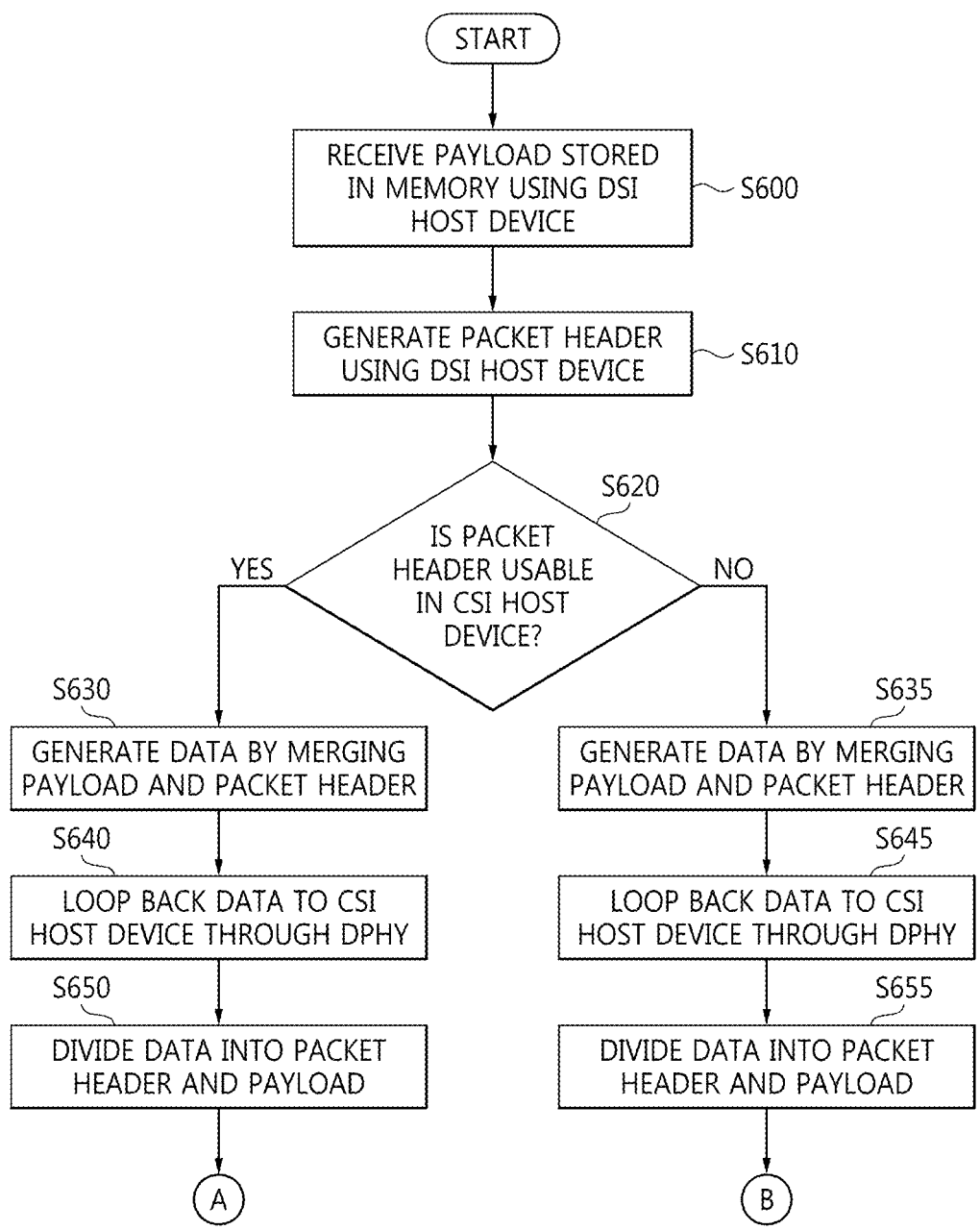
FIGS. 6A and 6B are flowcharts illustrating a procedure in which data is looped back according to exemplary embodiments of the inventive concept.
Figure 6B:
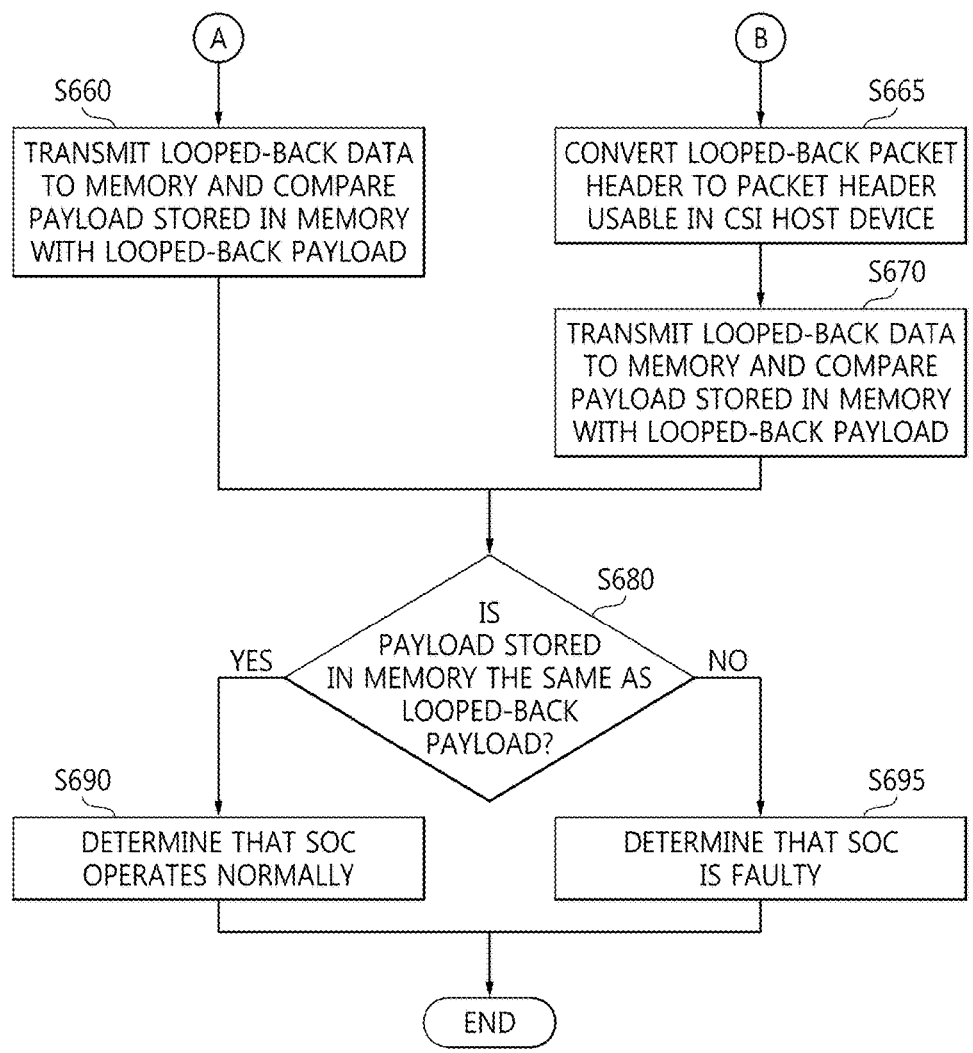

FIGS. 6A and 6B are flowcharts illustrating a procedure in which data is looped back according to exemplary embodiments of the inventive concept. Referring to FIGS. 1, 2A, 6A, and 6B, the DSI host device 150 may receive a payload stored in the memory 120 in operation S600, and may generate a packet header in operation S610. The packet header generated in operation S610 may correspond to the payload received and stored in the memory 120 in operation S600. When the SOC 105 operates in the video mode, the packet header generator 213 may generate the packet header based on a video mode protocol in response to the second flag stored in the second register 153. When the SOC 105 operates in the command mode, the packet header generator 213 may generate the packet header based on the command mode protocol in response to the second flag stored in the second register 153.

At operation S620, it is determined whether the packet header is a CSI packet header that is usable in the CSI host device 160. When the packet header is determined to be a CSI packet header that is usable in the CSI host device 160, the packet merging circuit 230 may generate data by merging the CSI packet header and the payload in operation S630. The DSI host device 150 may loop back the data to the CSI host device 160 through the DPHY master 170 in operation S640. That is, the DSI host device 150 may transmit the data to the CSI host device 160 through the DPHY master 170 in operation S640. The packet distribution circuit 310 may divide the data into a CSI packet header and a payload in operation S650. The data unpacking circuit 343 may decompress/unpack the looped-back payload according to the control of the data controller 335.

The CSI host device 160 may transmit the decompressed looped-back payload to the memory 120, and the processor 110 may compare the payload stored in the memory 120 with the looped-back payload in operation S660.

Referring back to operation S620, when it is determined that the packet header is not a CSI packet header that is usable in the CSI host device 160 (e.g., when the packet header is a DSI packet header), the packet merging circuit 230 may generate data by merging the DSI packet header and the payload in operation S635. The DSI host device 150 may loop back the data to the CSI host device 160 through the DPHY master 170 in operation S645. That is, the DSI host device 150 may transmit the data to the CSI host device 160 through the DPHY master 170 in operation S645. The packet distribution circuit 310 may divide the data into a DSI packet header and a payload in operation S655. The data controller 335 may convert the looped-back packet header to a CSI packet header that is usable in the CSI host device 160 in response to the third flag stored in the third register 161 in operation S665.

The data unpacking circuit 343 may decompress/unpack the looped-back payload according to the control of the data controller 335. The CSI host device 160 may transmit the decompressed looped-back payload to the memory 120, and the processor 110 may compare the payload stored in the memory 120 with the looped-back payload in operation S670.

At operation S680, it is determined whether the payload stored in the memory 120 is the same as the looped-back payload. When the payload stored in the memory 120 is determined to be the same as the looped-back payload (e.g., when the payloads match), the processor 110 determines that the SOC 105 operates normally in operation S690. When it is determined that the payload stored in the memory 120 is not the same as the looped-back payload in operation S680 (e.g., when the payloads do not match), the processor 110 determines that the SOC 105 is faulty in operation S695.

Figure 7A:
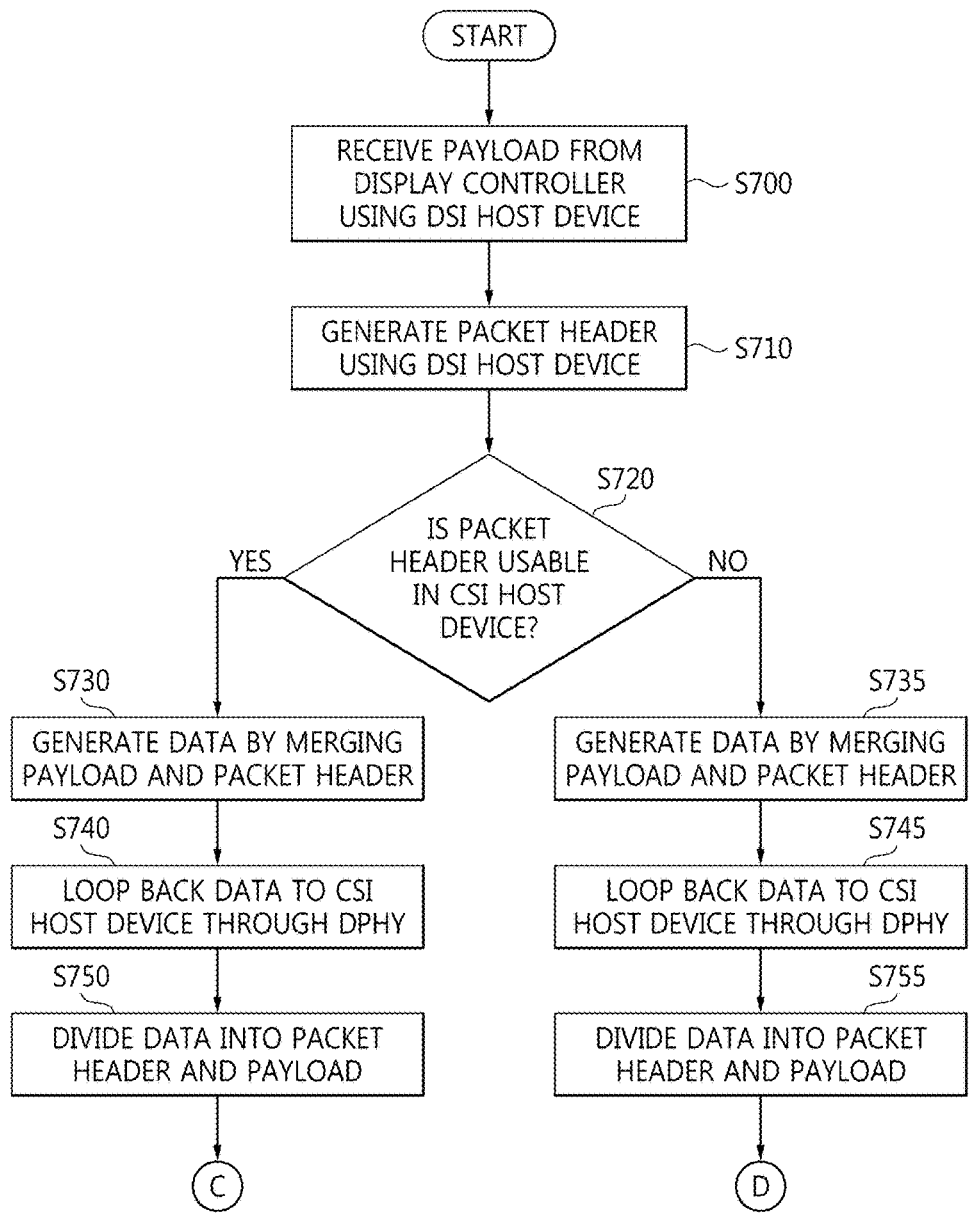
FIGS. 7A and 7B are flowcharts illustrating a procedure in which data is looped back according to exemplary embodiments of the inventive concept.
Figure 7B:
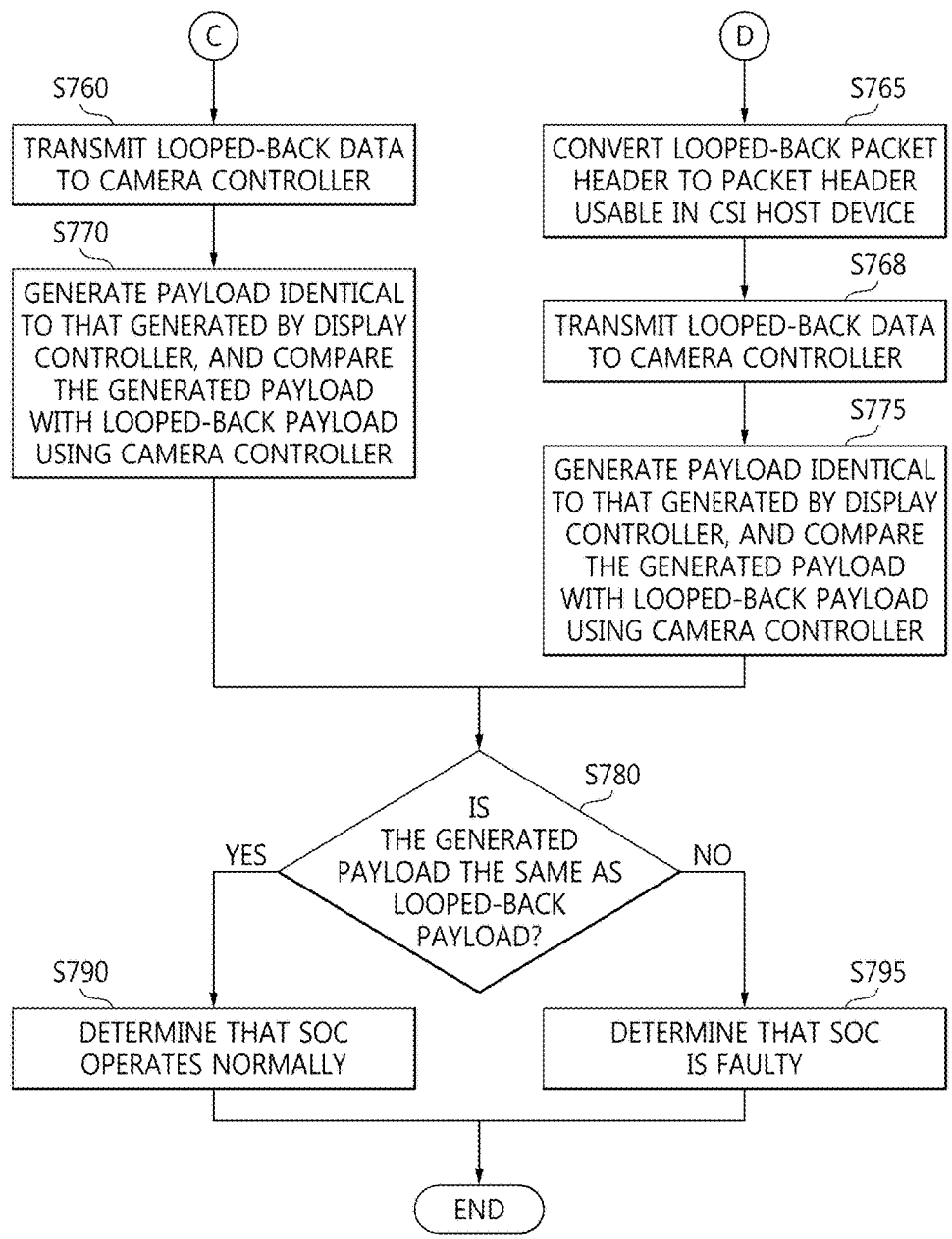

FIGS. 7A and 7B are flowcharts illustrating a procedure in which data is looped back according to exemplary embodiments of the inventive concept. Referring to FIGS. 1, 2B, 7A, and 7B, the DSI host device 150 may receive a payload generated by the first image generator 131 included in the display controller 130 in operation S700, and may generate a packet header in operation S710. When the SOC 105 operates in the video mode, the packet header generator 213 may generate the packet header based on a video mode protocol in response to the second flag stored in the second register 153. When the SOC 105 operates in the command mode, the packet header generator 213 may generate the packet header based on the command mode protocol in response to the second flag stored in the second register 153.

At operation S720, it is determined whether the packet header is a CSI packet header that is usable in the CSI host device 160. When the packet header is determined to be a CSI packet header that is usable in the CSI host device 160, the packet merging circuit 230 may generate data by merging the CSI packet header and the payload in operation S730. The DSI host device 150 may loop back the data to the CSI host device 160 through the DPHY master 170 in operation S740. That is, the DSI host device 150 may transmit the data to the CSI host device 160 through the DPHY master 170 in operation S740. The packet distribution circuit 310 may divide the data into a CSI packet header and a payload in operation S750. The data unpacking circuit 343 may decompress/unpack the looped-back payload according to the control of the data controller 335.

The CSI host device 160 may transmit the decompressed looped-back payload to the camera controller 140 in operation S760. The camera controller 140 may generate a payload that is identical to the payload that has been generated by the display controller 130 (e.g., that is identical to the payload as initially generated by the display controller 130 prior to the payload being looped back to the CSI host device 160), and may compare the generated payload with the looped-back payload in operation S770.

Referring back to operation 8720, when it is determined that the packet header is not a CSI packet header that is usable in the CSI host device 160 (e.g., when the packet header is a DSI packet header), the packet merging circuit 230 may generate data by merging the DSI packet header and the payload in operation S735. The DSI host device 150 may loop back the data to the CSI host device 160 through the DPHY master 170 in operation S745. That is, the DSI host device 150 may transmit the data to the CSI host device 160 through the DPHY master 170 in operation S745. The packet distribution circuit 310 may divide the data into a DSI packet header and a payload in operation S755. The data controller 335 may convert the looped-back packet header to a CSI packet header that is usable in the CSI host device 160 in response to the third flag stored in the third register 161 in operation S765. The data unpacking circuit 343 may decompress/unpack the looped-back payload according to the control of the data controller 335.

The CSI host device 160 may transmit the decompressed looped-back payload to the camera controller 140 in operation S768. The camera controller 140 may generate a payload that is identical to the payload that has been generated by the display controller 130, and may compare the generated payload with the looped-back payload in operation S775.

At operation S780, it is determined whether the generated payload is the same as the looped-back payload. When the generated payload is determined to be the same as the looped-back payload (e.g., when the payloads match), the processor 110 determines that the SOC 105 operates normally in operation S790. When it is determined that the generated payload is not the same as the looped-back payload in operation S780 (e.g., when the payloads do not match), the processor 110 determines that the SOC 105 is faulty in operation S795.

As described above, according to exemplary embodiments of the inventive concept, by looping back a signal output from a DSI to a CSI through a D-PHY, a method of testing a SOC does not require a separate chip for testing. As a result, according to exemplary embodiments of the inventive concept, SOC testing cost and time may be reduced.

Exemplary embodiments of the inventive concept provide a system on chip (SOC) allowing loopback of data from a display serial interface (DSI) within the SOC to a camera serial interface (CSI) within the SOC during testing of the SOC. Thus, the cost and time associated with testing the SOC may be reduced by eliminating the need for a separate, external device(s)/chip(s) to be connected to the SOC to test the SOC.

While the inventive concept has been particularly shown and described with reference to the exemplary embodiments thereof, it will be understood by those of ordinary skill in the art that various changes in form and detail may be made therein without departing from the spirit and scope of the inventive concept as defined by the following claims.

What is claimed is:

1. A system on chip, comprising:
   a display serial interface (DSI) host device configured to generate a camera serial interface (CSI) packet header or a DSI packet header, and to merge the generated CSI or DSI packet header and a first payload to generate first data, referring to a first flag;
   a CSI host device configured to receive the first data, and to unpack the first data into a second payload and the generated CSI or DSI packet header, wherein, when the generated CSI or DSI packet header is the generated DSI packet header, the CSI host device is further configured to convert the generated DSI packet header into a converted CSI packet header that is usable in the CSI host device;
   a loopback control circuit configured to loop back the first data generated by the DSI host device to the CSI host device without outputting to an outside of the system on chip in response to the first flag; and
   a processor configured to compare the first payload with the second payload, wherein the first flag indicates whether the system on chip is operating in a loop back mode or a non-loopback mode.

2. The system on chip of claim 1, further comprising:
   a first register configured to store the first flag.

3. The system on chip of claim 1, wherein the loopback control circuit transmits the first data to one of the CSI host device and a display device in response to the first flag.

4. The system on chip of claim 3, wherein when the first flag indicates the loop back mode, the loopback control circuit transmits the first data to the CSI host device.

5. The system on chip of claim 4, wherein when the first flag indicates the loop back mode, the loopback control circuit blocks an image signal from an image sensor to the CSI host device.

6. The system on chip of claim 1, wherein the first data corresponds to either of video mode data or command mode data, and a packet header conversion protocol corresponding to the video mode data is different from a packet header conversion protocol corresponding to the command mode data.

7. The system on chip of claim 6, wherein the DSI host device generates a vertical sync signal of the video mode data.

8. The system on chip of claim 6, wherein the DSI host device generates a tearing effect signal to compose the generated CSI or DSI packet header of the command mode data.

9. The system on chip of claim 1, further comprising:
   a display controller configured to control a display;
   a camera controller configured to control an image sensor;
   a first register configured to store the first flag;
   a second register configured to store a second flag indicating whether the generated CSI or DSI packet header is the CSI packet header or the DSI packet header; and a third register configured to store a third flag indicating whether a looped-back packet header is to be converted to another protocol.

10. A system on chip, comprising:
a display serial interface (DSI) host device configured to generate a display serial interface DSI packet header, and to merge the generated DSI packet header and a first payload to generate first data, referring to a first flag;
a CSI host device configured to receive the first data, and to unpack the first data into a second payload and the generated DSI packet header,
wherein the CSI host device is further configured to convert the generated DSI packet header into a converted CSI packet header that is usable in the CSI host device;
a loopback control circuit configured to loop back the first data generated by the DSI host device to the CSI host device without outputting to an outside of the system on chip in response to the first flag; and
a processor configured to compare the first payload with the second payload,
wherein the first flag indicates whether the system on chip is operating in a loop back mode or a non-loopback mode.

11. The system on chip of claim 10, further comprising:
a first register configured to store the first flag.

12. The system on chip of claim 10, wherein the loopback control circuit transmits the first data to one of the CSI host device and a display device in response to the first flag.

13. The system on chip of claim 12, wherein when the first flag indicates the loop back mode, the loopback control circuit transmits the first data to the CSI host device.

14. The system on chip of claim 13, wherein when the first flag indicates the loop back mode, the loopback control circuit blocks an image signal from an image sensor to the CSI host device.

15. The system on chip of claim 10, wherein the first data corresponds to either of video mode data or command mode data, and a packet header conversion protocol corresponding to the video mode data is different from a packet header conversion protocol corresponding to the command mode data.

16. The system on chip of claim 15, wherein the DSI host device generates a vertical sync signal of the video mode data.

17. The system on chip of claim 15, wherein the DSI host device generates a tearing effect signal to compose the generated DSI packet header of the command mode data.

18. The system on chip of claim 10, further comprising:
a display controller configured to control a display;
a camera controller configured to control an image sensor; and
a first register configured to store the first flag.

* * * * *